(12) United States Patent
Malladi et al.

(10) Patent No.: US 10,908,820 B2
(45) Date of Patent: Feb. 2, 2021

(54) HOST-BASED AND CLIENT-BASED COMMAND SCHEDULING IN LARGE BANDWIDTH MEMORY SYSTEMS

(71) Applicant: Samsung Electronics Co., Ltd., Suwon-si (KR)

(72) Inventors: Krishna T. Malladi, San Jose, CA (US); Hongzhong Zheng, Los Gatos, CA (US); Robert Brennan, Santa Clara, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 15/821,686

(22) Filed: Nov. 22, 2017

(65) Prior Publication Data

US 2019/0079677 A1   Mar. 14, 2019

Related U.S. Application Data

(60) Provisional application No. 62/558,732, filed on Sep. 14, 2017, provisional application No. 62/558,741, (Continued)

(51) Int. Cl.
*G06F 3/06* (2006.01)
*G06F 13/16* (2006.01)
(Continued)

(52) U.S. Cl.
CPC ............ *G06F 3/0611* (2013.01); *G06F 3/068* (2013.01); *G06F 3/0659* (2013.01); *G06F 12/02* (2013.01);
(Continued)

(58) Field of Classification Search
CPC .... G06F 3/0659; G06F 3/068; G11C 11/4076
See application file for complete search history.

(56) References Cited

U.S. PATENT DOCUMENTS

| | | | |
|---|---|---|---|
| 5,396,641 A * | 3/1995 | Iobst | G06F 7/509 |
| | | | 700/2 |
| 5,901,304 A | 5/1999 | Hwang et al. | |

(Continued)

OTHER PUBLICATIONS

Pattnaik, Ashutosh et al., "Scheduling Techniques for GPU Architectures with Processing-In-Memory Capabilities", PACT '16, Sep. 11-15, 2016, Haifa, Israel.
(Continued)

*Primary Examiner* — Ryan Bertram
*Assistant Examiner* — Trang K Ta
(74) *Attorney, Agent, or Firm* — Renaissance IP Law Group LLP

(57) ABSTRACT

A high-bandwidth memory (HBM) system includes an HBM device and a logic circuit. The logic circuit receives a first command from the host device and converts the received first command to a processing-in-memory (PIM) command that is sent to the HBM device through the second interface. A time between when the first command is received from the host device and when the HBM system is ready to receive another command from the host device is deterministic. The logic circuit further receives a fourth command and a fifth command from the host device. The fifth command requests time-estimate information relating to a time between when the fifth command is received and when the HBM system is ready to receive another command from the host device. The time-estimate information includes a deterministic period of time and an estimated period of time for a non-deterministic period of time.

20 Claims, 10 Drawing Sheets

Related U.S. Application Data filed on Sep. 14, 2017, provisional application No. 62/558,726, filed on Sep. 14, 2017.

(51) Int. Cl.
 *G06F 12/02* (2006.01)
 *G06F 15/78* (2006.01)
 *G06F 13/42* (2006.01)

(52) U.S. Cl.
 CPC ...... *G06F 13/1615* (2013.01); *G06F 13/1689* (2013.01); *G06F 13/4243* (2013.01); *G06F 15/7821* (2013.01)

(56) References Cited

U.S. PATENT DOCUMENTS

| | | |
|---|---|---|
| 6,622,235 B1 | 9/2003 | Keller et al. |
| 6,763,443 B1 | 7/2004 | Clark et al. |
| 7,412,553 B2 | 8/2008 | Morrow |
| 8,321,627 B1 | 11/2012 | Norrie et al. |
| 9,201,777 B2 | 12/2015 | Hsu et al. |
| 9,633,748 B2 | 4/2017 | Shibata |
| 2005/0114557 A1 | 5/2005 | Arai et al. |
| 2008/0162855 A1 | 7/2008 | Thomas |
| 2009/0063760 A1 | 3/2009 | Weddle |
| 2009/0138641 A1* | 5/2009 | Adar ................ G06F 13/36 710/110 |
| 2014/0075135 A1* | 3/2014 | Choi ................ G11C 11/4076 711/155 |
| 2016/0070483 A1* | 3/2016 | Yoon ................ G06F 13/1689 711/154 |
| 2016/0210174 A1 | 7/2016 | Hsieh et al. |
| 2016/0299693 A1* | 10/2016 | Sakdeo ................ G06F 3/0605 |
| 2016/0379686 A1 | 12/2016 | Burger et al. |
| 2017/0220499 A1 | 8/2017 | Gray |
| 2017/0255390 A1* | 9/2017 | Chang ................ G06F 3/0605 |
| 2017/0277440 A1 | 9/2017 | Willcock |
| 2017/0358327 A1* | 12/2017 | Oh ................ G06F 12/084 |
| 2018/0107406 A1* | 4/2018 | O ................ G06F 3/0611 |

OTHER PUBLICATIONS

Notice of Allowance for U.S. Appl. No. 15/821,688, dated Nov. 5, 2019.

* cited by examiner

# HOST-BASED AND CLIENT-BASED COMMAND SCHEDULING IN LARGE BANDWIDTH MEMORY SYSTEMS

CROSS-REFERENCE TO RELATED APPLICATION

This patent application claims the priority benefit under 35 U.S.C. § 119(e) of U.S. Provisional Patent Application No. 62/558,726, filed on Sep. 14, 2017, Provisional Patent Application No. 62/558,732, filed on Sep. 14, 2017, and Provisional Patent Application No. 62/558,741, filed on Sep. 14, 2017, the disclosures of which are incorporated herein by reference in their entirety.

TECHNICAL FIELD

The subject matter disclosed herein generally relates to high-bandwidth memory (HBM) systems, and more particularly, to a system and protocol that allows deterministic and non-deterministic processing in memory operations to interface with a host device.

BACKGROUND

Emerging applications, like deep neural networks, use massive computational and memory abilities to train on different datasets and learn with high accuracy. Moreover, as applications like high-performance computing (HPC), graphics algorithms, etc., become data- and compute-intensive, energy-efficiency and low latency become critical characteristics. Processing in memory (PIM) has the ability to address these challenges by scheduling complex operations on DRAM logic dies to provide additional compute abilities in a lower-power technology process and also closer to where the data is located.

SUMMARY

An example embodiment provides a high-bandwidth memory (HBM) system that may include an HBM device and a logic circuit. The logic circuit may include a first interface capable of being coupled to a host device and a second interface coupled to the HBM device. The logic circuit may be capable of receiving a first command from the host device and converting the received first command to a processing-in-memory (PIM) command in which the PIM command may be sent to the HBM device through the second interface. A time between when the first command is received from the host device and when the HBM system is ready to receive another command from the host device may be deterministic. The first command may be for a PIM operation on a single address in the HBM device or a PIM operation on a plurality of addresses in a same row in the HBM device. The logic circuit may further receive a second command from the host device for a PIM operation within one or more banks in a same channel in the HBM device, and a time between when the second command is received from the host device and when the HBM system is ready to receive another command from the host device may be deterministic.

Another example embodiment provides a high-bandwidth memory (HBM) system that may include an HBM device and a logic circuit. The logic circuit may include a first interface capable of being coupled to a host device and a second interface coupled to the HBM device. The logic circuit may be capable of receiving one or more commands from the host device and converting each received command to at least one corresponding processing-in-memory (PIM) command in which each PIM command may be sent through the second interface to the HBM device. The logic circuit may be further capable of receiving a first command from the host device for a PIM operation in the HBM device, and a second command from the host device subsequent to the first command in which the second command may request a first time-estimate information relating to a time between when the second command is received from the host device and when the HBM system is ready to receiving another command from the host device in which the first time-estimate information including a deterministic period of time and a non-deterministic period of time. In one embodiment, the non-deterministic period of time comprises an estimated period of time. The logic circuit may further receive a third command from the host device for a PIM operation in the HBM device, and a fourth command from the host device subsequent to the third command in which the fourth command may request a second time-estimate information relating to a time between when the third command is received from the host device and when the HBM system is ready to receive another command from the host device in which the second time-estimate information may include a deterministic period of time and a credit-based period of time. The logic circuit further may receive a fifth command from the host device for a PIM operation in the HBM device, and a sixth command from the host device subsequent to the fifth command in which the sixth command may request a third time-estimate information relating to a time between when the sixth command is received from the host device and when the HBM system is ready to receiving another command from the host device and in which the third time-estimate information may include a deterministic period of time and a retry period of time.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
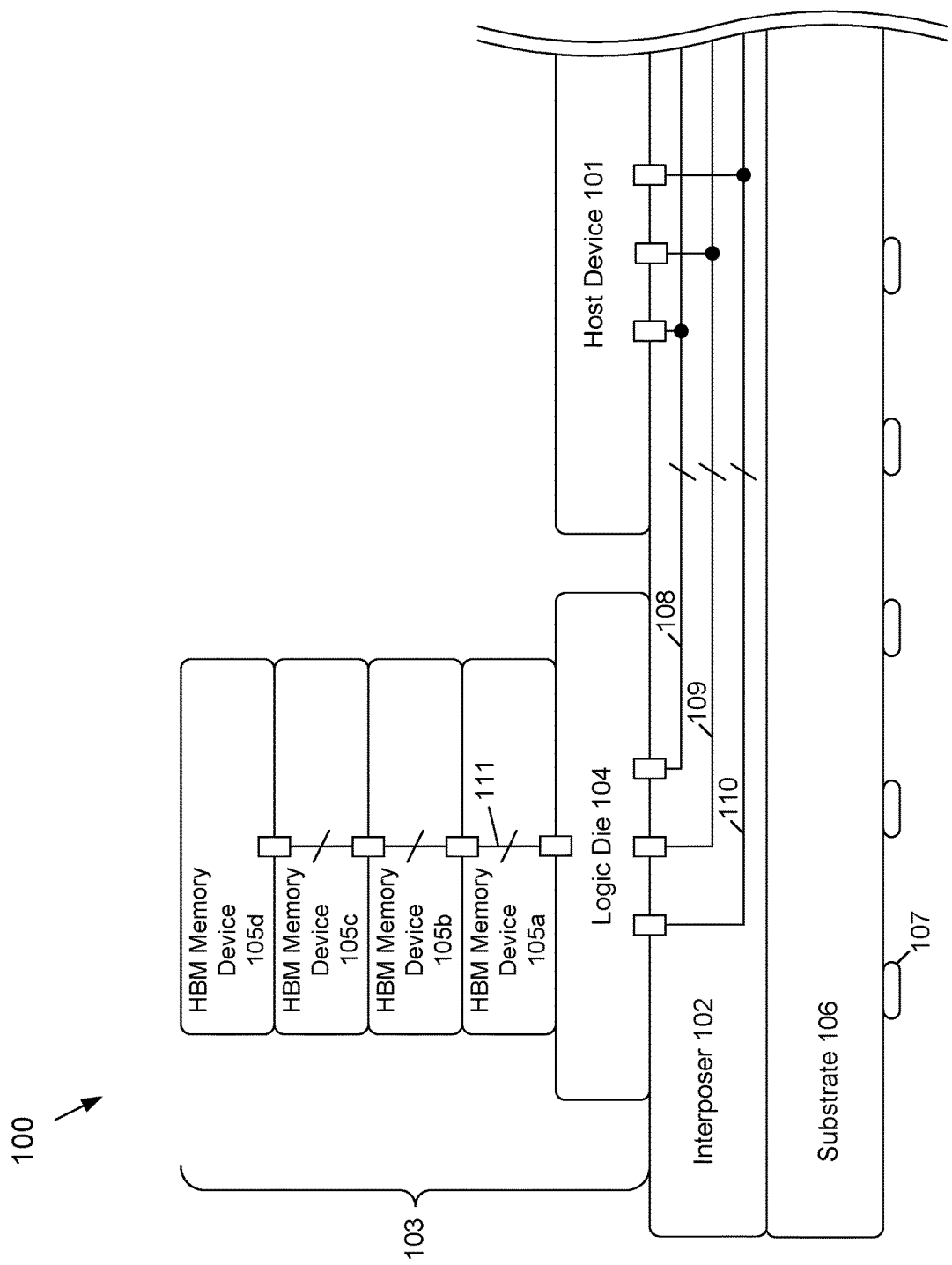
FIG. 1 depicts a cross-sectional drawing of a portion of an example embodiment of a HBM+ system according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The subject matter disclosed herein relates to a quasi-synchronous interface protocol for high bandwidth PIM (HBM+) systems. That is, the subject matter disclosed herein provides an interface between an HBM+ system and a host device that includes both latencies that are deterministic and latencies that are non-deterministic; hence, a quasi-synchronous interface protocol. Communications under the quasi-synchronous protocol disclosed herein may be synchronized with one or more clock signals, but the particular latency associated with a particular operation, such as a PIM operation, may have a deterministic latency or a non-deterministic latency for completion. The PIM operations that may provide a deterministic latency may be effectuated using a one-step HBM+ protocol, whereas the PIM operations that may provide a non-deterministic latency may be effectuated using a two-step HBM+ protocol.

FIG. 1 depicts a cross-sectional drawing of a portion of an example embodiment of a HBM+ system 100 according to the subject matter disclosed herein. The HBM+ system 100 may include a host processing device (host device) 101, an interposer 102, and an HBM+ stack 103. The HBM+ stack 103 may include a logic circuit, or die, 104 and a plurality of HBM+ memory devices 105a-105d arranged on a top surface of the logic die 104. The host device 101 and the HBM+ stack 103 may be fastened to a top surface of the interposer 102.

In one embodiment, the host device 101 may be, but is not limited to, a central processing unit (CPU), a graphics processing unit (GPU), a graphics accelerator or a Field Programmable Gate Array (FPGA).

An HBM+ memory device 105 may be divided into two channels in which there may be 16 banks per channel. One or more of the HBM+ memory devices 105a-105d may also include PIM functionality and regular data storage functionality, such as conventional read and write operations. The PIM functionality that is provided in the HBM+ memory devices may be provided more efficiently by the HBM+ memory devices 105 than that by the host device 101. The logic die 104 may include logic functionality to control the PIM functionality in the HBM+ memory devices 105. An HBM+ internal bus 111 connects the logic die 104 to each of the HBM+ memory devices 105. The HBM+ internal bus 111 may include a plurality of address lines, a plurality of command lines, a plurality of data lines and/or one or more other signaling lines. It should be understood that although only four HBM+ memory devices 105 are shown in the HBM+ stack 103, any number of HBM+ memory devices 105 may form an HBM+ stack 103. Additionally, even though only a portion of the HBM+ system 100 is depicted in FIG. 1, it should be understood that there may be additional HBM+ stacks 103 that may be attached to the top surface of the interposer 102.

The interposer 102 may be fastened to a top surface of a substrate 106. The substrate 106 may include terminals 107 that may be used to provide electrical connections to other devices (not shown). In addition to providing a structural base for the host device 101 and the HBM+ stack(s) 103, the interposer 102 also provides an electrical connection between the host device 101 and the HBM+ stack 103. In one embodiment, the interposer 102 may include a command/address (CA) bus 108, a data bus 109 and a transaction bus 110 that are electrically coupled between the host device and the HBM+ stack 103. It should be understood that the interposer 102 may include additional electrical connections that are not shown.

Each of the CA bus 108, the data bus 109 and the transaction bus 110 may include a plurality of lines and/or bits. In one embodiment, the transaction bus 110 may include a transaction response RSP_R signal and a transaction error RSP_E signal. The CA bus 108, the data bus 109 and the transaction bus 119 may operate within the HBM+ system 100 in a synchronous-type manner. That is, the CA bus 108, the data bus 109 and the transaction bus 110 operate in synchronism with one or more clock signals.

In one embodiment, the HBM+ system 100 may include a one-step HBM+ protocol for communicating commands and data between the host device 101 and the HBM+ stack 103 for instances in which the timing between issuance of a command or a transaction and an output of a response, whether based on a regular data storage function and/or a PIM function, or when the HBM+ stack 103 is ready for another command or transaction is deterministic. The HBM+ system 100 may also include a two-step HBM+ protocol for communicating commands and data between the host device 101 and the HBM+ stack 103 for instances in which the timing between issuance of a command or a transaction and an output of a response, whether based on a regular data storage function and/or a PIM function, or when the HBM+ stack 103 is ready for another command or transaction is non-deterministic. As used herein, the term "quasi-synchronous interface" means an interface through which both deterministic communications and non-deterministic communications or transactions pass.

The one-step HBM+ protocol is generally intended for relatively regular data storage and simple PIM operations in which the host device 101 does not wait for a result. That is, the time, or latency, between issuance of a command and the output of a response is deterministic so that the host device 101 may perform other operations in the interim between the issuance of the command and the output of the response.

Alternatively, the host device 101 may be scheduled to resume regular transactions at the end of the deterministic latency. Typically, the simple PIM operations include one or two source and/or destination addresses, and do not include a stride parameter.

The two-step HBM+ protocol is generally intended for more complex PIM operations, such as, but not limited to, many source and/or destination addresses, matrix operations, operations that include a stride, in which the host device 101 may wait for a result. The time, or latency, between issuance of a command and the output of a response is non-deterministic so that the host device 101 may perform other operations in the interim between the issuance of the command and the output of the response, or between the issuance of a command and when the HBM+ stack 103 is ready to receive another command or transaction. Table 2 sets forth some example HBM+ PIM command categories and timing estimates.

Figure 2:
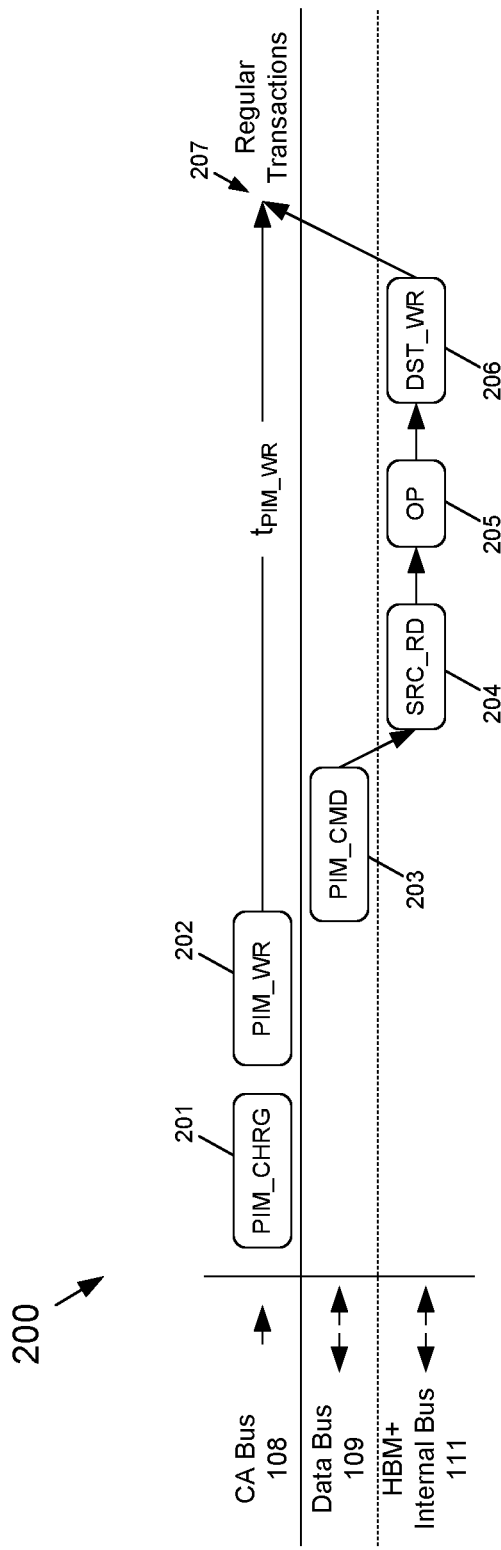
FIG. 2 depicts an overview timing-type diagram for an example one-step HBM+ protocol command according to the subject matter disclosed herein.

FIG. 2 depicts an overview timing-type diagram 200 for an example one-step HBM+ protocol command according to the subject matter disclosed herein. It should be understood that the timing-type diagram 200 is not to scale and is intended only to depict a relative sequence of the one-step HBM+ protocol for an example PIM command. The timing-type diagram 200 includes arrows associated with the different busses to generally indicate the unidirectional or bidirectional nature of the particular bus. In particular, arrows pointing from the left to the right indicate a communication, transaction or signal sent from the host device 101 to the HBM+ stack 103, whereas arrows pointing from the right to the left indicate a communication, transaction or signal sent from the HBM+ stack 103 to the host device 101. In all of the timing-type diagrams disclosed herein, transactions and operations indicated as occurring over the HBM+ internal bus 111 are not visible to devices outside of the HBM+ stack 103.

At 201 in FIG. 2, the host device 101 issues a PIM_CHRG command over the CA bus 108. The PIM_CHRG command includes bank and channel identification information for a PIM_CMD that will be issued. In response to the PIM_CHRG command, the logic die 104 pre-charges the relevant banks in the one or more selected channels, and locks the relevant banks in the one or more selected channels to guarantee ownership of the relevant banks to the host device 101 and the forthcoming PIM_CMD command. Immediately following the PIM_CHRG command, the host device 101 issues a PIM_WR command at 202 over the CA bus 108. Table 1 sets forth example physical signal parameters for the PIM_CHRG and the PIM_WR commands.

TABLE 1

Example physical signal parameters for the PIM_CHRG and PIM_WR commands.

| | CKE_0 | | | | | | | |
|---|---|---|---|---|---|---|---|---|
| Function | Previous Cycle | Current Cycle | R[0] | R[1] | R[2] | R[3] | R[4] | R[5] |
| PIM_CHRG | H | H | H | L | H | X | X | X |
| PIM_WR | H | H | L | L | L | X | X | X |

In Table 1, example pin identifications based on a current JEDEC HBM standard are shown across the top. An "H" represents a high logic voltage level, and an "L" represents a low logic voltage level. An "X" represents a "do not care" logic voltage level.

Figure 3:
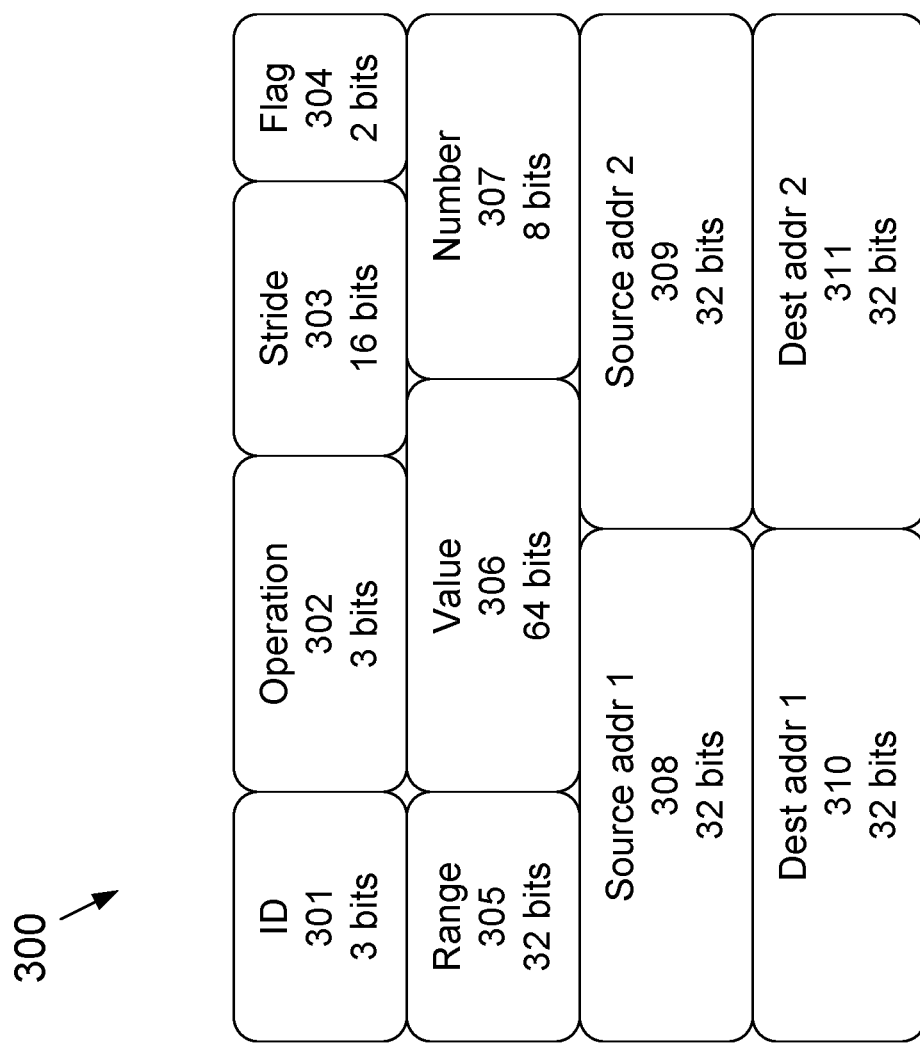
FIG. 3 depicts an example arrangement of the contents of a PIM_CMD command according to the subject matter disclosed herein.

FIG. 3 depicts an example arrangement of the contents of a PIM_CMD command 300 according to the subject matter disclosed herein. A PIM_CMD contains the actual PIM command, and is sent over the data bus 109 as opposed to being sent over the CA bus 108. The logic die 104 decodes the PIM_CMD and issues commands internal to the HBM+ stack 103 to complete the PIM operation contained in the PIM_CMD command. In one embodiment, the PIM_CMD has a fixed size, or length, although not all PIM commands may use all of the fields of the PIM_CMD.

As shown in the example arrangement depicted in FIG. 3, a PIM_CMD command 300 may include an ID field 301, an operation field 302, a stride field 303, a flag field 304, a range field 305, a value field 306, a number field 307, a source address 1 field 308, a source address 2 field 309, a destination address 1 field 310, and a destination address 2 field 311. In one embodiment, the ID field 301 may include three bits, and the operation field 302 may include three bits. The stride field 303 may include 16 bits. The flag field 304 may include two bits, and the range field 305 may include 32 bits. The value field 306 may include 64 bits. The number field 307 may include eight bits. The source address 1 field 308 may include 32 bits, and the source address 2 field 309 may include 32 bits. The destination address 1 field 310 may include 32 bits, and the destination address 2 field 311 may include 32 bits. Other and/or additional fields, field arrangements, and/or field sizes are possible.

Returning to FIG. 2, the PIM_WR command sent over the CA bus 108 at 202 is used to send a PIM_CMD over the data bus 109 at 203. In one embodiment, the PIM_CMD command as it appears on the data bus 109 may be subsequent to the PIM_WR command as it appears on the CA bus 108. In another embodiment, the PIM_CMD command as it appears on the data bus 109 may be at least partially simultaneous with the PIM_WR command as it appears on the CA bus 108.

In response to the PIM_CMD, the logic die 104 for this overview description sends a source read command SRC_RD at 204 over the HBM+ internal bus 111 to read the data that will be the source for the PIM operation contained in the PIM_CMD. For this example, a PIM operation OP is performed at 205. The results of the PIM operation are written to a destination address using a DST_WR command at 206, which has been sent by the logic die 104. At 207, the PIM operation has completed, and the HBM+ stack 103 is ready to receive further regular operations, PIM operations and/or other transactions from the host device 101.

Figure 5:
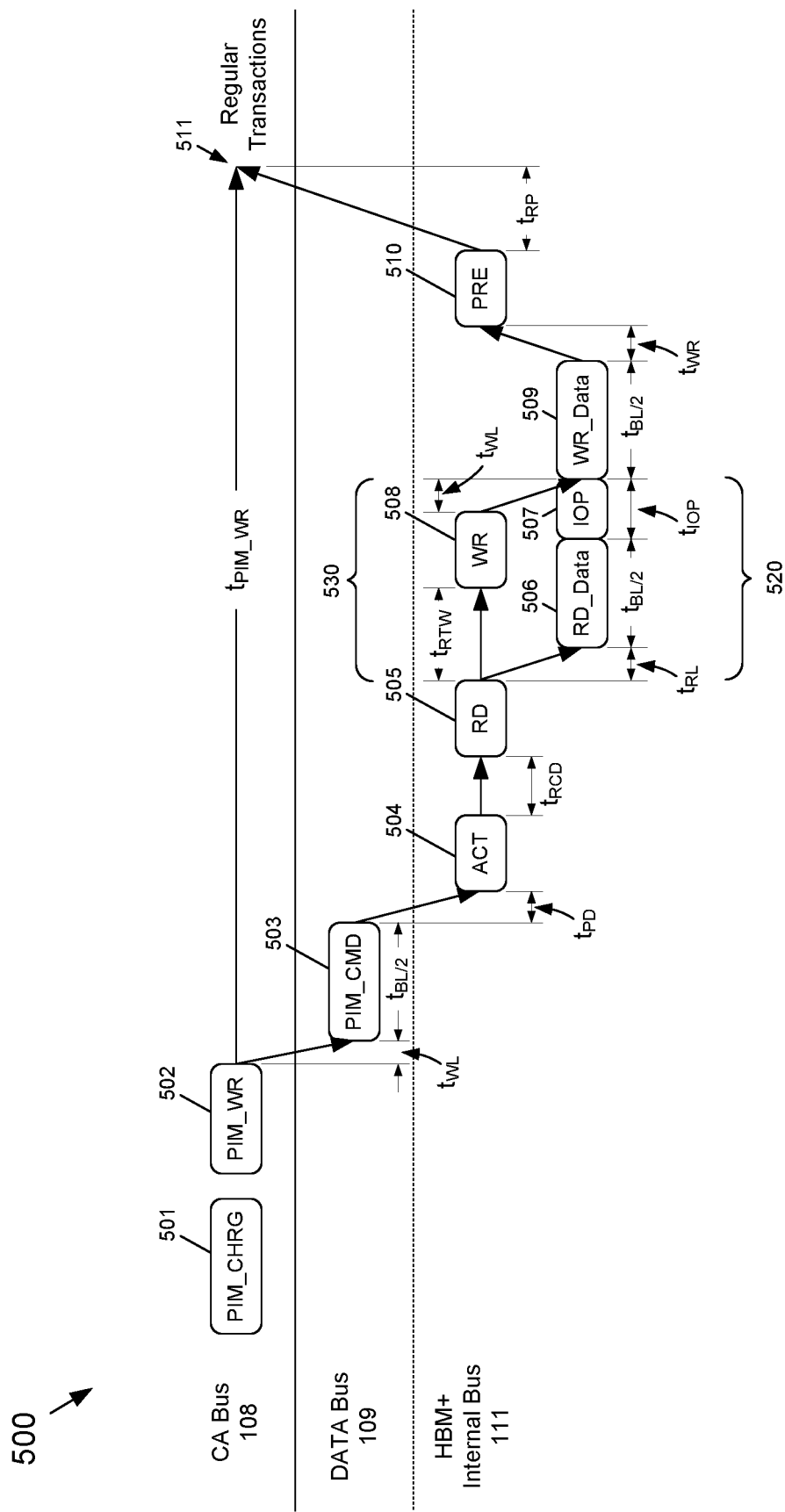
FIG. 5 depicts a timing-type diagram for an example one-step HBM+ protocol PIM command in which the PIM operation is directed to a single address or directed to a same row in an HBM+ device according to the subject matter disclosed herein.
Figure 6:
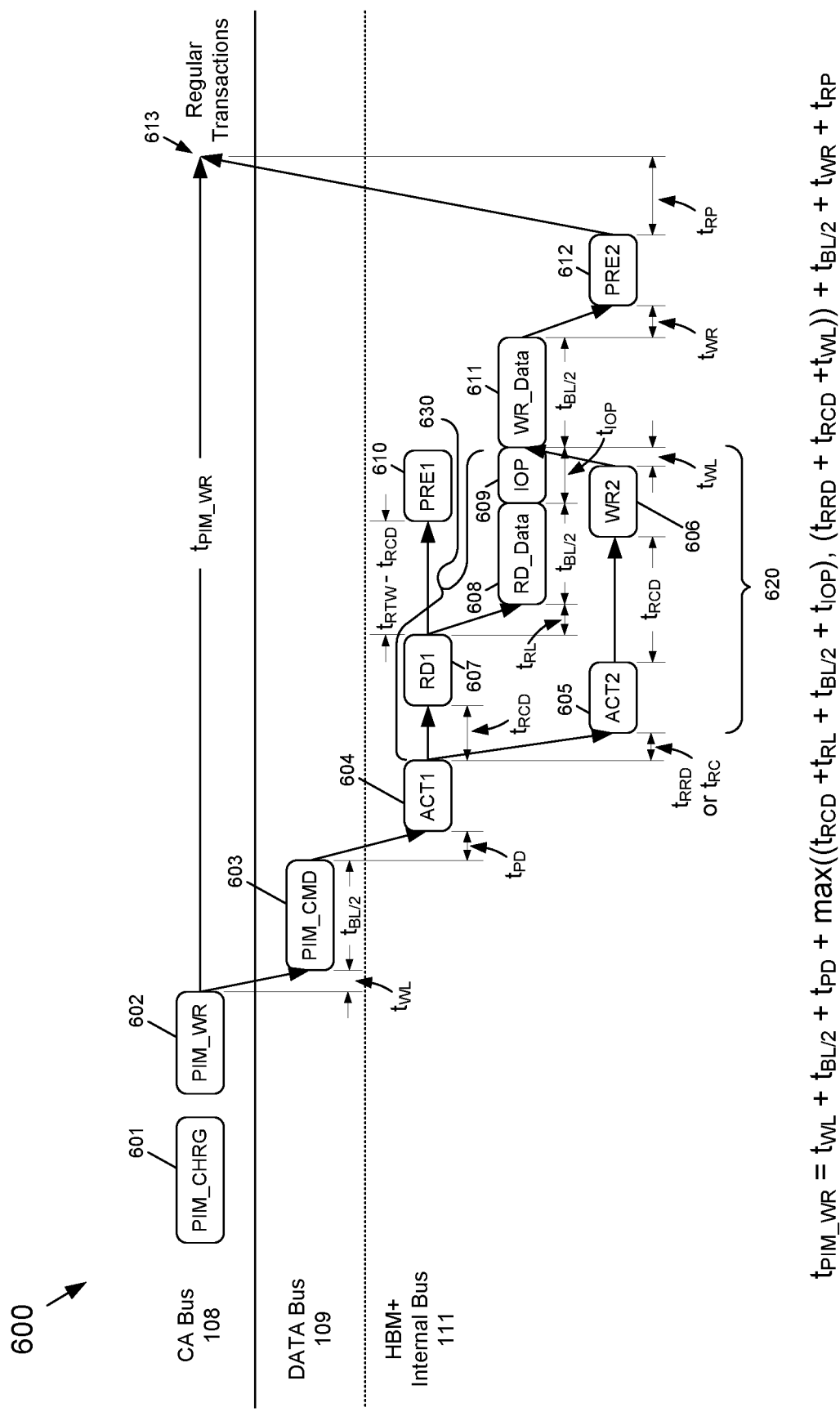
FIG. 6 depicts a timing-type diagram for an example one-step HBM+ protocol PIM command in which the PIM operation is within banks in the same channel according to the subject matter disclosed herein.
Figure 7:
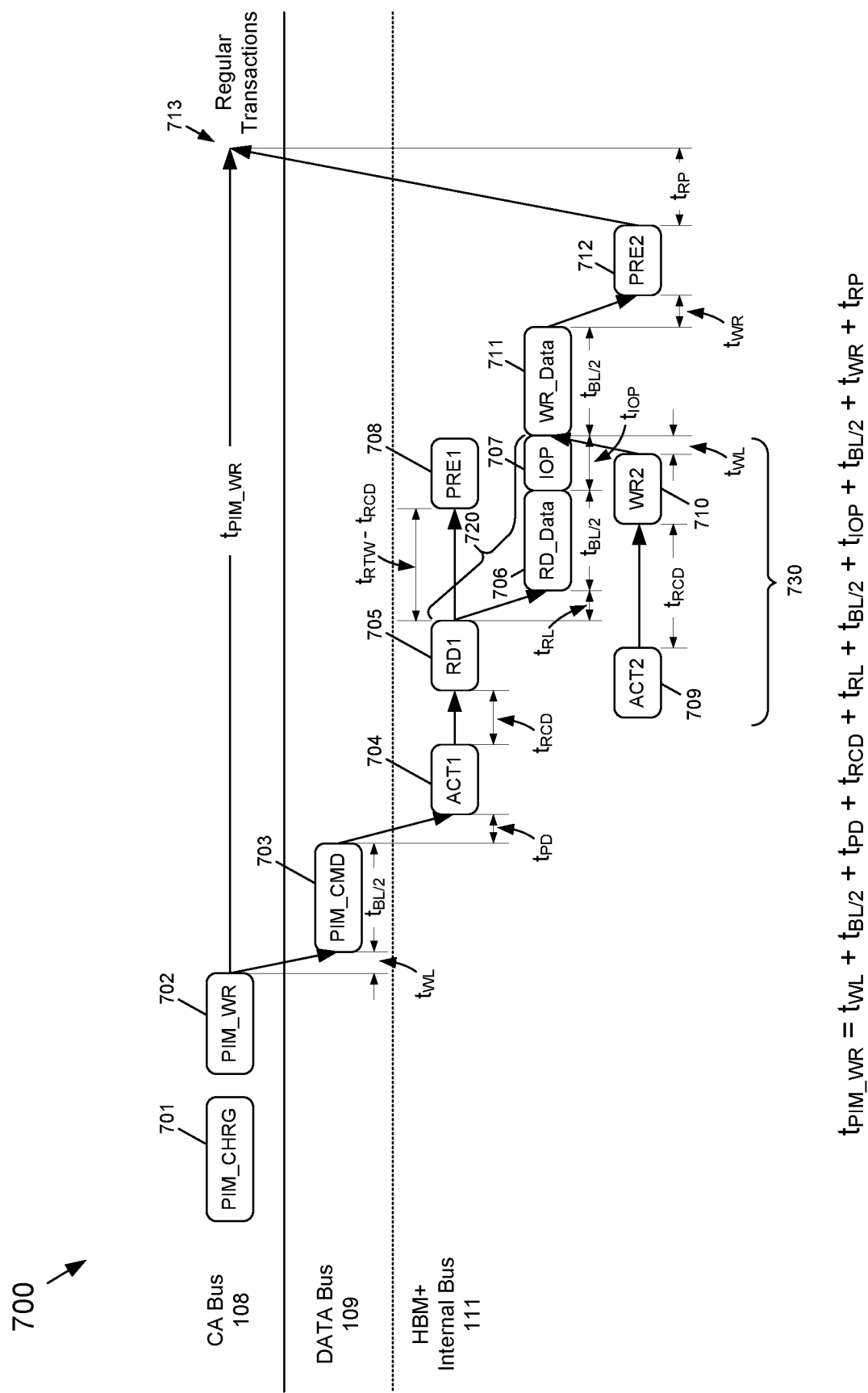
FIG. 7 depicts a timing-type diagram for an example one-step HBM+ protocol PIM command in which the PIM operation is across different channels according to the subject matter disclosed herein.

The timing of one-step HBM+ protocol depicted in FIG. 2 is deterministic; therefore, the time between when the PIM_WR command is issued at 202 and when the HBM+ stack 103 is ready to receive another command and/or transaction from the host device 101 (i.e., resume regular transactions) is indicated in FIG. 2 as $t_{PIM\_WR}$. That is, the timing $t_{PIM\_WR}$ may be thought of as a minimum time before a new command or transaction may be issued by the host device 101 to the same channel/bank in the HBM+ stack 103. To represent the deterministic nature of the timing for a one-step HBM+ protocol, the arrows between the various commands, transactions and responses indicated in FIG. 2 are shown as solid arrows. FIGS. 5-7 respectively depict timing-type diagrams for several different deterministic timing scenarios.

Figure 4:
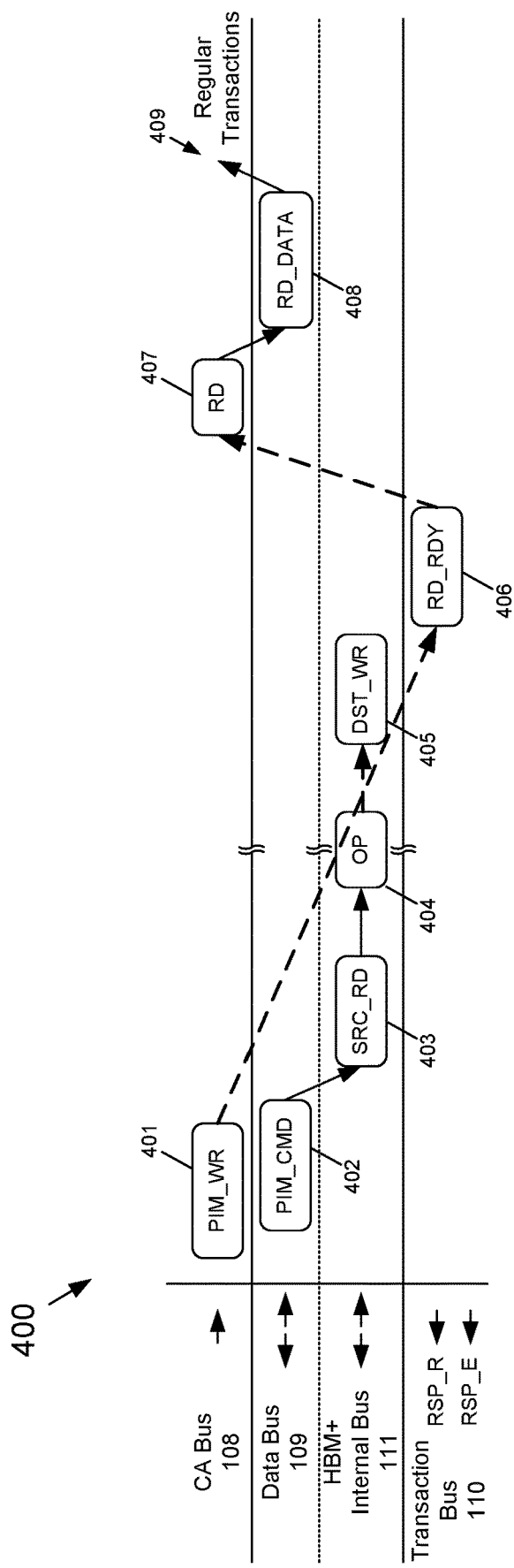
FIG. 4 depicts an overview timing-type diagram for an example one-step HBM+ protocol command according to the subject matter disclosed herein.

FIG. 4 depicts an overview timing-type diagram 400 for an example one-step HBM+ protocol command according to the subject matter disclosed herein. It should be understood that the timing-type diagram 400 is not to scale and is intended only to depict a relative sequence of the two-step HBM+ protocol for an example PIM command. Similar to the timing-type diagram 200 of FIG. 2, the timing-type diagram 400 includes arrows associated with the different busses to generally indicate the unidirectional or bidirectional nature of the particular bus.

In FIG. 4, the host device 101 issues a PIM_CHRG command over the CA bus 108, which is not shown for space considerations in FIG. 4. As with the one-step HBM+ protocol, the PIM_CHRG command includes bank and channel identification information for a PIM_CMD will soon be issued. In response to the PIM_CHRG command, the logic die 104 pre-charges the relevant banks in one or more selected channels, and locks the entire HBM+ stack 103 to guarantee ownership of the stack 103 the host device 101. Immediately following the PIM_CHRG command (again, not shown), at 401 the host device 101 issues a PIM_WR command over the CA bus 108. At 402, the host device 101 issues a PIM_CMD on the data bus 109.

In response to the PIM_CMD, the logic die 104 sends a source read command SRC_RD at 403 over the HBM+ internal bus 111 to read the source data for the operation indicated in the PIM_CMD. The PIM operation OP is performed at 404. The results of the PIM operation are written to a destination address using a DST_WR command at 405. For the example timing depicted in FIG. 4, at 406 the logic die 104 sends a read ready command RD_RDY over the transaction bus 110 to the host device 101. At 407, the host device 101 sends a read command RD over the CA bus 108. At 408, the logic die 104 outputs the read data RD_DATA over the data bus 109, and at 409 the host device 101 may result regular operations and transactions. For some two-step HBM+ protocol PIM commands, instead of sending a read ready command RD_RDY to the host device 101, the logic die 104 sends an indication to the host device 101 as to when the PIM operation may be completed so that the host device 101 may schedule other operations in the interim. Some example scenarios of the logic die 104 sending such indications are described in connection with FIGS. 8-10.

In contrast to the one-step HBM+ protocol, the two-step HBM+ protocol has a non-deterministic timing characteristic because the PIM operation OP is generally more complex for a two-step HBM+ protocol and may take an indeterminate amount of time depending on the PIM operation. For example, a matrix transpose PIM operation that is to be performed on a 100×100 matrix may take longer than the same matrix transpose PIM operation on a 10×10 matrix even though the PIM transpose operation is the same operation in both cases. To represent that the timing associated with a two-step HBM+ operation is generally non-deterministic, some of the arrows indicated between the commands and responses in FIG. 4 are shown as heavy dashed arrows. For example, the arrow between the PIM_WR command at 401 and the RD_RDY response at 406 and arrow between the RD_RDY response at 406 and the RD command at 407 are shown as heavy dashed arrows to indicate the non-deterministic nature of the two-step HBM+ protocol. The non-deterministic nature is also indicated by the heavy dashed arrow between the PIM OP at 404 and the DST_WR response at 405.

Table 2 sets forth some example HBM+ PIM command categories and timing estimates.

| # | Category | Function Examples | Projected $t_{IOP}$ (cycles) | Type of Operation |
|---|---|---|---|---|
| 1. | Data atomicity | Read-modify-write | 1 | Register copy |
| | | Test and set | 2 | Register compare + copy |
| | | Compare and Swap (CAS) | 2 | Register compare + copy |
| | | Increment | 1 | Register ALU |
| 2. | Data copying | Mem-copy | 1 | Register copy |
| | | Mem-set | 1 | Register copy |
| 3. | Data reshaping | Transpose, Pack/unpack, Swap | Protocol specified | Multiple copies |
| 4. | Data reduction | Popcount, accumulation, bitwise operations, sum, min, dot-product | Protocol specified | Multiple copies, ALU |
| 5. | Special functions | Map function, hash, pattern match | Protocol specified | Multiple copies, ALU |

From the point of view of the host device 101, the deterministic nature of the one-step HBM+ protocol may be considered to provide a host-based command scheduling protocol. For example, FIG. 5 depicts a timing-type diagram 500 for an example one-step HBM+ protocol PIM command in which the PIM operation is directed to a single address or directed to a same row in an HBM+ device according to the subject matter disclosed herein. It should be understood that the timing-type diagram 500 is not to scale and is intended only to depict a relative sequence of the one-step HBM+ protocol for the example PIM operation directed to a single address or directed to a same row in an HBM+ device.

At 501, the host device 101 issues a PIM_CHRG command over the CA bus 108. The PIM_CHRG command includes bank and channel identification information for a PIM_CMD that will soon be issued. In response to the PIM_CHRG command, the logic die 104 pre-charges the relevant banks in the one or more selected channels, and locks the relevant banks in the one or more selected channels to guarantee ownership to the host device 101 during the PIM operation. Immediately following the PIM_CHRG command, the host device 101 issues a PIM_WR command at 502 over the CA bus 108. At 503, the host device 101 sends a PIM_CMD over the data bus 109. In this example, consider the PIM_CMD to be a command to increment a value in a memory location in an HBM+ device 104. The time delay between the PIM_WR command and the PIM_CMD command is $t_{WL}$, which is the write time latency that must be waited between sending the PIM_WR command and sending the PIM_CMD command. The PIM_CMD command takes a burst length latency of $t_{BL/2}$ for a double data rate (DDR) HBM memory device.

There is a propagation delay of $t_{PD}$ for the logic die 104 to decode the PIM_CMD and to issue an ACT command at 504 to the HBM+ stack 103 over the HBM internal bus 111. The activation latency for the selected row is $t_{RCD}$. At 505, the logic die 104 issues a read command RD to load the selected source data. The latency for the reading of the selected data along path 520 is $t_{RL}$. At 506, the selected source data is read with a latency of $t_{BL/2}$. At 507, the PIM operation OP is performed with a latency of $t_{IOP}$. In this example, the PIM operation OP is to increment a value in a memory location in an HBM+ device 104, which is a relatively noncomplex PIM operation.

In a parallel path indicated by 530 in FIG. 5, the logic die 104 issues a write command WR at 508 after a latency of $t_{RTW}$ because data will be written back to memory at the end of the PIM command OP at 507. The latency associated with the write command WR is $t_{WL}$. In one embodiment, the logic die 104 determines the proper time to send the write command WR at 508 so that the timing is correct in order to write the resulting data at 509.

At 509, in response to the write command WR, the results of the PIM operation OP are written back to memory with a burst length latency of $t_{BL/2}$. The recovery time latency after the results at written back to memory is $t_{WR}$. At 510, the logic die 104 issues a pre-charge command PRE for the row to which the results have been written, and a pre-charge latency of $t_{RP}$ follows before the host device 101 may issue further transaction and/or commands to the HBM+ stack 103 at 511.

Thus, for this scenario in which the PIM operation is directed to a single address or directed to a same row in an HBM+ device, the time $t_{PIM\_WR}$ between when the PIM_WR command is issued at 502 and when the HBM+ stack 103 is ready to receive another command and/or transaction from the host device 101 at 511 is determined as $$t_{PIM\_WR} = t_{WL} + t_{BL/2} + t_{PD} + t_{RCD} + \max((t_{RL} + t_{BL/2} + t_{IOP}), (t_{RTW} + t_{WL})) + t_{BL/2} + t_{WR} + t_{RP},$$

in which the maximum latency between the paths 520 and 530 in FIG. 5 is used to define $t_{PIM\_WR}$. The latency of path 520 is $(t_{RL} + t_{BL/2} + t_{IOP})$, whereas the latency of path 530 is $(t_{RTW} + t_{WL})$.

Another one-step HBM+ protocol scenario that also may be considered to provide a host-based command scheduling protocol is depicted in FIG. 6. In particular, FIG. 6 depicts a timing-type diagram 600 for an example one-step HBM+ protocol PIM command in which the PIM operation is within banks in the same channel according to the subject matter disclosed herein. It should be understood that the timing-type diagram 600 is not to scale and is intended only to depict a relative sequence of the one-step HBM+ protocol for the example PIM operation directed to banks in the same channel.

At 601, the host device 101 issues a PIM_CHRG command over the CA bus 108. The PIM_CHRG command includes bank and channel identification information for a PIM_CMD that will soon be issued. In response to the PIM_CHRG command, the logic die 104 pre-charges the relevant banks in the one or more selected channels, and locks the relevant banks in the one or more selected channels to guarantee ownership to the host device 101 during the PIM operation. Immediately following the PIM_CHRG command, the host device 101 issues a PIM_WR command at 602 over the CA bus 108. At 603, the host device 101 sends a PIM_CMD over the data bus 109. In this example, consider the PIM_CMD to be a command to set a memory location B to be equal to a memory location A in which the locations A and B are within banks in the same channel in an HBM+ device 104. The write time latency between the PIM_WR command and the PIM_CMD command is $t_{WL}$. The PIM_CMD command takes a burst latency of $t_{BL/2}$ for a DDR HBM memory device.

In response to the PIM_CMD at 603, the logic die 104 sends an activate command ACT1 at 604 to the HBM+ stack 103 over the HBM internal bus 111 to activate the first source data address (i.e., location A). The propagation delay latency for the logic die 104 to decode the PIM_CMD and then to issue the ACT1 command at 604 is $t_{PD}$.

In a first parallel path 620, the logic die 104 issues an activate command ACT2 at 605 to activate the second source data address (i.e., location B). The latency between the issuance of the ACT1 command and the ACT2 command is $t_{RRD}$ or $t_{RC}$. If the PIM operation is going between two different banks, the latency will (generally) be $t_{RRD}$. (It should be noted that if the source and the destination addresses are between two different banks that are within a same bank group, the latency would be $t_{RRDL}$; however, if the source and destination addresses are in two different banks that are in different bank groups, the latency would be $t_{RRDF}$.) If the PIM operation is within the same bank, the latency will be $t_{RC}$. In this parallel path 620, there is also a latency of $t_{RCD}$ before the logic die 104 issues a write command WR2 at 606, and there will be a latency following the write command WR2 of $t_{WL}$.

In a second parallel path 630, the logic die 104 issues a read command RD1 at 607 in response to the activation ACT1 command. There is a latency of $t_{RCD}$ after the activate command ACT1 and before the read command RD1. There is a latency of $t_{RL}$ between the time the read command RD1 is issued and a read data RD_DATA operation of 608. Data is read at 608 with a burst length latency of $t_{BL/2}$. At 609, the PIM operation OP is performed with a latency of $t_{IOP}$.

In order to write the data resulting from the PIM operation OP, there is a latency of $t_{RTW}-t_{RCD}$ after the read command RD1 for the logic die 104 to issue a pre-charge command PRE1 at 610. At 611, in response to the write command WR2, the results of the PIM operation OP are written back to memory with a latency of $t_{BL/2}$. The recovery time latency after the results at written back to memory is $t_{WR}$. At 612, the logic die 104 issues a pre-charge command PRE2 for the row to which the results have been written to recover, and a latency of $t_{RP}$ follows before the host device 101 may issue further transactions and/or commands to the HBM+ stack 103 at 613.

Thus, for this scenario in which the PIM operation is directed to banks in the same channel, the time $t_{PIM\_WR}$ between when the PIM_WR command is issued at 602 and when the HBM+ stack 103 is ready to receive another command from the host device 101 at 613 is determined as $$t_{PIM\_WR}=t_{WL}+t_{BL/2}+t_{PD}+\max((t_{RCD}+t_{RL}+t_{BL/2}+t_{IOP}),(t_{RRD}+t_{RCD}+t_{WL}))+t_{BL/2}+t_{WL}+t_{RP},$$

in which the maximum latency between the paths 620 and 630 in FIG. 6 is used to define $t_{PIM\_WR}$. The latency of path 620 is $(t_{RCD}+t_{BL/2}+t_{IOP})$, whereas the latency of path 630 is $(t_{RRD}+t_{RCD}+t_{WL})$.

Still another one-step HBM+ protocol scenario that also may be considered to provide a host-based command scheduling protocol is depicted in FIG. 7. In particular, FIG. 7 depicts a timing-type diagram 700 for an example one-step HBM+ protocol PIM command in which the PIM operation is across different channels according to the subject matter disclosed herein. It should be understood that the timing-type diagram 700 is not to scale and is intended only to depict a relative sequence of the one-step HBM+ protocol for an example PIM operation across different channels.

At 701, the host device 101 issues a PIM_CHRG command over the CA bus 108. The PIM_CHRG command includes bank and channel identification information for a PIM_CMD that will soon be issued. In response to the PIM_CHRG command, the logic die 104 pre-charges the relevant banks in the one or more selected channels, and locks the relevant banks in the one or more selected channels to guarantee ownership of the relevant banks to the host device 101 during the PIM operation. Immediately following the PIM_CHRG command, the host device 101 issues a PIM_WR command at 702 over the CA bus 108. The host device 101 sends a PIM_CMD over the data bus 109 at 703. The time latency between the PIM_WR command and the PIM_CMD command is $t_{WL}$, which is the time that must be waited between sending the PIM_WR command and sending the PIM_CMD command. The PIM_CMD command has a burst length latency of $t_{BL/2}$ for a DDR HBM memory device.

In response to the PIM_CMD at 703, the logic die 104 sends an activate command ACT1 at 704 to the HBM+ stack 103 over the HBM internal bus 111. The time latency for the logic die 104 to decode the PIM_CMD and then to issue the ACT1 command at 704 is $t_{PD}$. A latency $t_{RCD}$ later, the logic die 104 issues a read command RD1 at 705. In a first parallel path 720, there is a latency of $t_{RL}$ before the data is read RD_Data at 706 with a burst length latency of $t_{BL/2}$. The PIM operation OP is performed at 707 with a latency of $t_{IOP}$. In order to write the data resulting from the PIM operation OP, there is a latency of $t_{RTW}-t_{RCD}$ after the read command RD1 at 705 for the logic die 104 to issue a pre-charge command PRE1 at 708.

In a second parallel path 730, the logic die 104 issues an activate command ACT2 at 709. In situations in which the PIM operation is across different channels, there are no constraints in terms of when the logic die 104 issues the activate command ACT2. There is a latency of $t_{RCD}$ before the logic die 104 issues a write command WR2 at 710. There is a latency of $t_{WL}$ between the time the write command WR2 is issued until the data is written WR_Data at 711. The data is written at 711 with a burst length latency of $t_{BL/2}$. There is a latency of $t_{WR}$ before the logic die 104 issues a pre-charge command PRE2 at 712 for the row to which the results have been written to recover, and a latency of $t_{RP}$ follows before the host device 101 may issue further transaction and/or commands to the HBM+ stack 103 at 713.

Thus, for this scenario in which the PIM operation is across different channels, the time $t_{PIM\_WR}$ between when the PIM_WR command is issued at 702 and when the HBM+ stack 103 is ready to receive another command from the host device 101 at 713 is determined as $$t_{PIM\_WR}=t_{WL}+t_{BL/2}+t_{PD}+t_{RCD}+t_{RL}+t_{BL/2}+t_{IOP}+t_{BL/2}+t_{WR}+t_{RP}.$$

Figure 8:
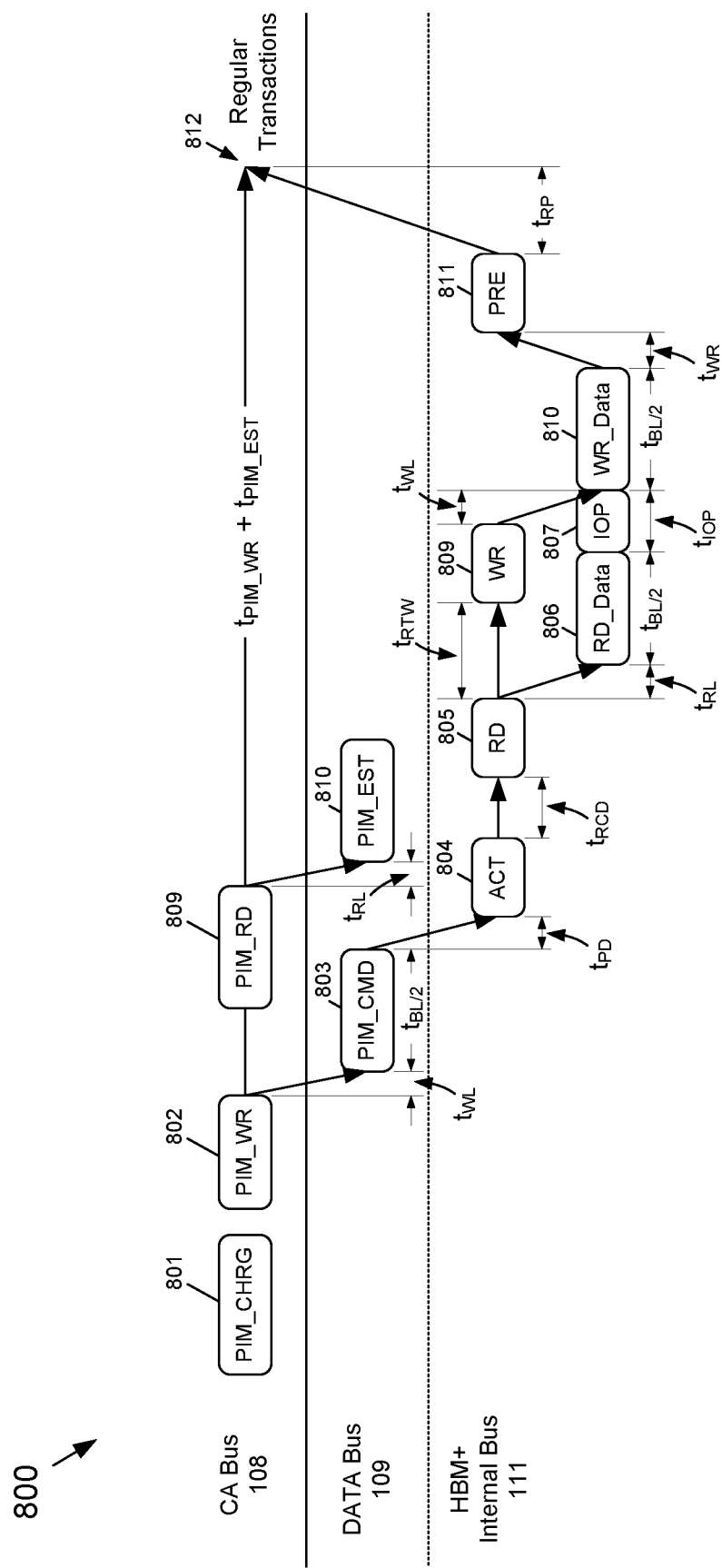
FIG. 8 depicts a timing-type diagram for an example two-step HBM+ protocol PIM command in which an HBM+ stack provides an estimate of time for when the PIM command will complete according to the subject matter disclosed herein.
Figure 9:
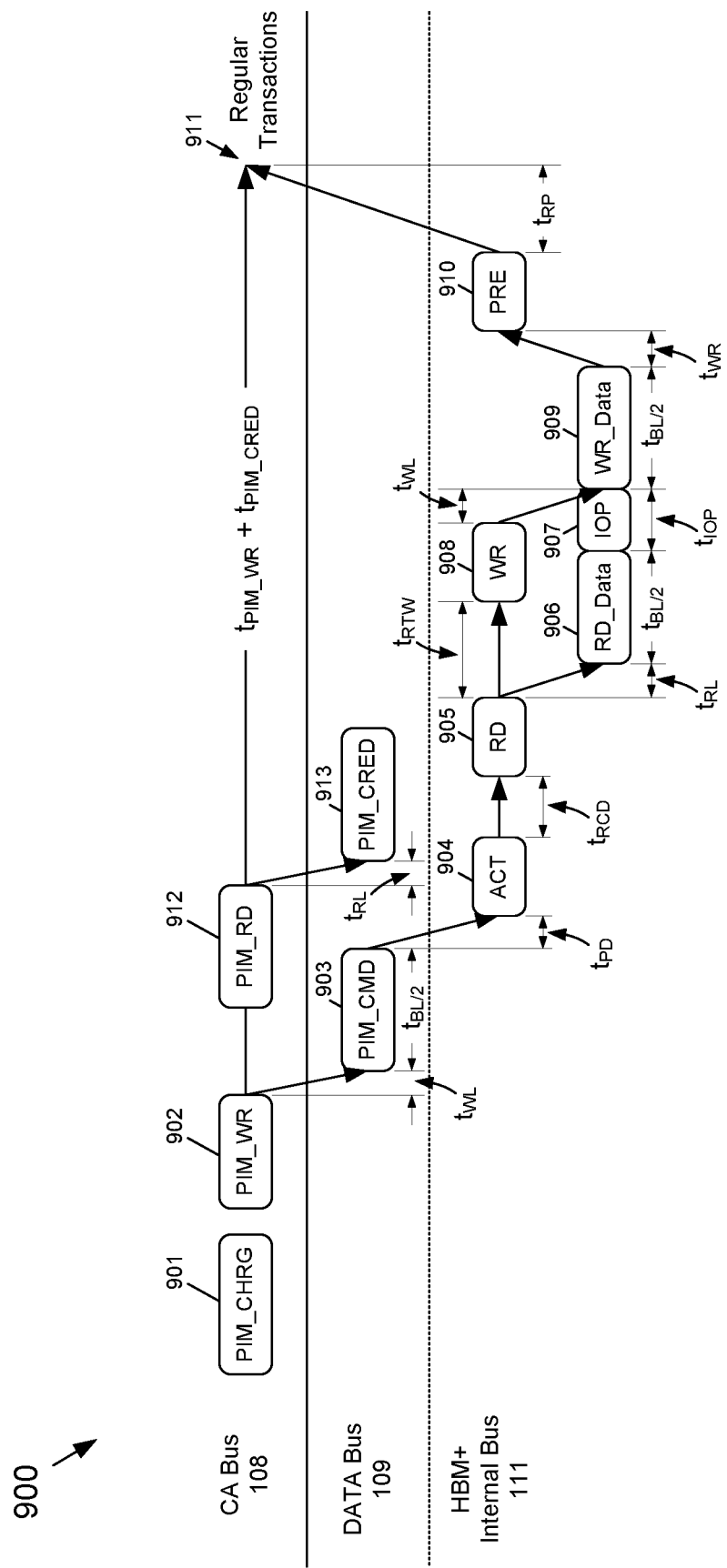
FIG. 9 depicts a timing-type diagram for an example two-step HBM+ protocol PIM command in which an HBM+ stack provides a credit-based indication for when the PIM command will complete according to the subject matter disclosed herein.
Figure 10:
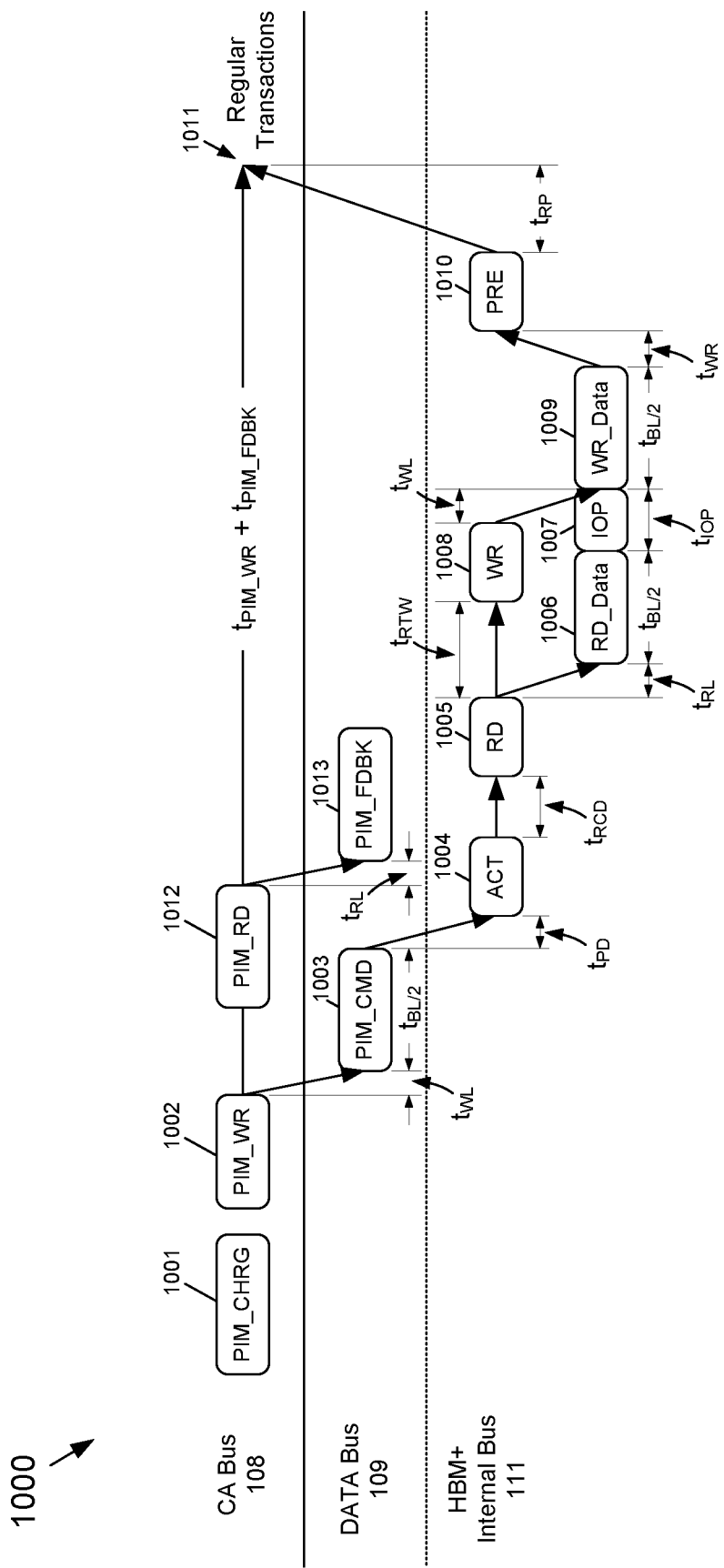
FIG. 10 depicts a timing-type diagram for an example two-step HBM+ protocol PIM command in which an HBM+ stack provides a feedback-based indication for when the PIM command will complete according to the subject matter disclosed herein.

FIGS. 8-10 depict timing-type diagrams for example two-step HBM+ protocol PIM commands in which the PIM operations are more complex than the one-step HBM+ protocol commands considered in FIGS. 5-7 and, consequently, have an overall non-deterministic timing for completion. Accordingly, some two-step HBM+ protocol PIM commands may be considered to provide a client-based command scheduling protocol and an HBM+ stack may provide an indication of when a PIM command may complete to account for the non-deterministic nature of some of the two-step HBM+ protocol PIM commands. In this regard, the logic die 104 may provide an indication to the host device 101 of the time that a complex PIM command will complete.

In one embodiment, the indication of the effective time may include an estimate of time. In another embodiment, the indication of the effective time may include a credit-based value. In still another embodiment, the indication of the effective time may include a retry-based feedback in which the host device is given an indication as to when to poll an HBM+ stack to see whether a PIM operation has completed. The indication for the time that a PIM command will complete provided to the host device may be based on or predicted from, but is not limited to, contents of an auto log, historical statistical information, a calculated estimation, ongoing traffic, and/or maximum bounds of PIM operations.

It should be noted that the two-step HBM+ protocol PIM commands depicted in the following timing-type diagrams of FIGS. 8-10 do not use the transaction bus 111, which is depicted in FIG. 1. Instead, the two-step HBM+ protocol PIM commands depicted in FIGS. 8-10 utilize the CA bus 108, the data bus 109 and the HBM+ internal bus 111 to provide the indication to the host device 101 of an effective time that a PIM command will complete.

FIG. 8 depicts a timing-type diagram 800 for an example two-step HBM+ protocol PIM command in which the HBM+ stack 103 provides an estimate of time for when the PIM command will complete according to the subject matter disclosed herein. It should be understood that the timing-type diagram 800 is not to scale and is intended only to depict the relative sequence of the two-step HBM+ protocol for when the HBM+ stack provides an estimate of time for when the example PIM operation will complete.

At 801, the host device 101 issues a PIM_CHRG command over the CA bus 108. The PIM_CHRG command includes bank and channel identification information for a PIM_CMD that will soon be issued. In response to the PIM_CHRG command, the logic die 104 pre-charges the relevant banks in the one or more selected channels, and locks the HBM+ stack 103 to guarantee ownership of the HBM+ stack to the host device 101 during the PIM operation. Immediately following the PIM_CHRG command, the host device 101 issues a PIM_WR command at 802 over the CA bus 108. The host device 101 sends a PIM_CMD over the data bus 109 at 803. The time latency between the PIM_WR command and the PIM_CMD command is $t_{WL}$. The PIM_CMD command takes a burst length latency of $t_{BL/2}$ for a DDR HBM memory device.

In response to the PIM_CMD at 803, the logic die 104 sends an activate command ACT1 at 804 to the HBM+ stack 103 over the HBM+ internal bus 111. The time latency for the logic die 104 to decode the PIM_CMD and then to issue the ACT1 command at 804 is $t_{PD}$. A latency $t_{RCD}$ later, the logic die 104 issues a read command RD1 at 805. There is a latency of $t_{RL}$ before the data is read RD_Data at 806 with a burst length latency of $t_{BL/2}$. The PIM operation OP is performed at 807 with a latency of $t_{IOP}$; however, because the PIM operation OP is complex, the latency associated with the PIM operation OP is non-deterministic.

The logic die 104 also issues a write command WR at 808 with a latency of $t_{RTW}$ after the read command RD has been issued at 805, but before the PIM operation OP has completed at 807. The results of the PIM operation OP are written to memory at 809 after the issuance of the write command WR with a latency of $t_{WL}$. At 810, the logic die 104 issues a pre-charge command PRE having a latency of $t_{WR}$. A latency of $t_{RP}$ follows before the host device 101 may issue further transaction and/or commands to the HBM+ stack 103 at 811.

Although many of the transactions depicted in timing-type diagram 800 may be deterministic aspects, the overall timing is of the entire transaction is non-deterministic. To account for the non-deterministic latency of the PIM operation OP at 807, the host device 101 issues a PIM_RD command over the CA bus 108 at 812. There will be a latency of $t_{RL}$ before the logic die 104 responds at 813 with a PIM_EST response. In this embodiment, the PIM_EST response may include an estimate of time that indicates the time that the PIM Operation OP at 807 will complete. In one embodiment, the estimate of time may be in units of time. In another embodiment, the estimate of time may be in units of clock cycles.

Thus, the effective time $t_{PIM\_WR(effective)}$ between when the PIM_WR command is issued at 802 and when the HBM+ stack 103 is ready to receive another command from the host device 101 at 812 is determined as $$t_{PIM\_WR(effective)} = t_{PIM\_WR} + t_{PIM\_EST},$$

in which $t_{PIM\_WR}$ represents the deterministic portion of the time for the PIM operation to complete, and $t_{PIM\_EST}$ represents an estimate of time of the non-deterministic portion of the time for the PIM operation to complete. FIG. 9 depicts a timing-type diagram 900 for an example two-step HBM+ protocol PIM command in which the HBM+ stack 103 provides a credit-based indication for when the PIM command will complete according to the subject matter disclosed herein. It should be understood that the timing-type diagram 900 is not to scale and is intended only to depict the relative sequence of the two-step HBM+ protocol for when the HBM+ stack provides a credit-based indication for when the example PIM operation will complete.

At 901, the host device 101 issues a PIM_CHRG command over the CA bus 108. The PIM_CHRG command includes bank and channel identification information for a PIM_CMD that will soon be issued. In response to the PIM_CHRG command, the logic die 104 pre-charges the relevant banks in the one or more selected channels, and locks the HBM+ stack 103 to guarantee ownership of the HBM+ stack to the host device 101 during the PIM operation. Immediately following the PIM_CHRG command, the host device 101 issues a PIM_WR command at 902 over the CA bus 108. The host device 101 sends a PIM_CMD over the data bus 109 at 903. The time latency between the PIM_WR command and the PIM_CMD command is $t_{WL}$. The PIM_CMD command takes a burst length latency of $t_{BL/2}$ for a DDR HBM memory device.

In response to the PIM_CMD at 903, the logic die 104 sends an activate command ACT1 at 904 to the HBM+ stack 103 over the HBM+ internal bus 111. The time latency for the logic die 104 to decode the PIM_CMD and then to issue the ACT1 command at 904 is $t_{PD}$. A latency $t_{RCD}$ later, the logic die 104 issues a read command RD1 at 905. There is a latency of $t_{RL}$ before the data is read RD_Data at 906 with a burst length latency of $t_{BL/2}$. The PIM operation OP is performed at 907 with a latency of $t_{IOP}$; however, because the PIM operation OP is complex, the latency associated with the PIM operation OP is non-deterministic.

The logic die 104 also issues a write command WR at 908 with a latency of $t_{RTW}$ after the read command RD has been issued at 905, but before the PIM operation OP has completed at 907. The results of the PIM operation OP are written to memory at 909 after the issuance of the write command WR with a latency of $t_{WL}$. At 910, the logic die 104 issues a pre-charge command PRE having a latency of $t_{WR}$. A latency of $t_{RP}$ follows before the host device 101 may issue further transaction and/or commands to the HBM+ stack 103 at 911.

Even though many of the transactions depicted in timing-type diagram 900 may be deterministic aspects, the overall timing is of the entire transaction is non-deterministic. To account for the non-deterministic latency of the PIM operation OP at 907, the host device 101 issues a PIM_RD command over the CA bus 108 at 912. There will be a latency of $t_{RL}$ before the logic die 104 responds at 913 with a PIM_CRED response. In this embodiment, the PIM_CRED response may include information relating to a number of credits that the host device 101 may use as a throttling mechanism. For example, if the PIM_CRED response indicates that the host device 101 has an integer number of credits greater that zero, the host device 101 may continue to issue commands and/or transactions to the HBM+ stack 103 until the host device 101 has no credits left.

Thus, the effective time $t_{PIM\_WR(effective)}$ between when the PIM_WR command is issued at 902 and when the HBM+ stack 103 is ready to receive another command from the host device 101 at 912 is determined as $$t_{PIM\_WR(effective)} = t_{PIM\_WR} + t_{PIM\_CRED},$$

in which $t_{PIM\_WR}$ represents the deterministic portion of the time for the PIM operation to complete, and $t_{PIM\_CRED}$ represents an integer number of credits greater that zero, the host device 101 may continue to issue commands and/or transactions to the HBM+ stack 103 until the host device 101 has no credits left.

FIG. 10 depicts a timing-type diagram 1000 for an example two-step HBM+ protocol PIM command in which the HBM+ stack 103 provides a feedback-based indication for when the PIM command will complete according to the subject matter disclosed herein. It should be understood that the timing-type diagram 1000 is not to scale and is intended only to depict the relative sequence of the two-step HBM+ protocol for when the HBM+ stack provides a feedback-based indication for when the example PIM operation will complete.

At 1001, the host device 101 issues a PIM_CHRG command over the CA bus 108. The PIM_CHRG command includes bank and channel identification information for a PIM_CMD that will soon be issued. In response to the PIM_CHRG command, the logic die 104 pre-charges the relevant banks in the one or more selected channels, and locks the HBM+ stack 103 to guarantee ownership of the HBM+ stack to the host device 101 during the PIM operation. Immediately following the PIM_CHRG command, the host device 101 issues a PIM_WR command at 1002 over the CA bus 108. The host device 101 sends a PIM_CMD over the data bus 109 at 1003. The time latency between the PIM_WR command and the PIM_CMD command is $t_{WL}$. The PIM_CMD command takes a burst length latency of $t_{BL/2}$ for a DDR HBM memory device.

In response to the PIM_CMD at 1003, the logic die 104 sends an activate command ACT1 at 1004 to the HBM+ stack 103 over the HBM+ internal bus 111. The time latency for the logic die 104 to decode the PIM_CMD and then to issue the ACT1 command at 1004 is $t_{PD}$. A latency $t_{RCD}$ later, the logic die 104 issues a read command RD1 at 1005. There is a latency of $t_{RL}$ before the data is read RD_Data at 1006 with a burst length latency of $t_{BL/2}$. The PIM operation OP is performed at 1007 with a latency of $t_{IOP}$; however, because the PIM operation OP is complex, the latency associated with the PIM operation OP is non-deterministic.

The logic die 104 also issues a write command WR at 1008 with a latency of $t_{RTW}$ after the read command RD has been issued at 1005, but before the PIM operation OP has completed at 1007. The results of the PIM operation OP are written to memory at 1009 after the issuance of the write command WR with a latency of $t_{WL}$. At 1010, the logic die 104 issues a pre-charge command PRE having a latency of $t_{WR}$. A latency of $t_{RP}$ follows before the host device 101 may issue further transaction and/or commands to the HBM+ stack 103 at 1011.

Many of the transactions depicted in timing-type diagram 1000 may be deterministic aspects, however, the overall timing is of the entire transaction is non-deterministic. To account for the non-deterministic latency of the PIM operation OP at 1007, the host device 101 issues a PIM_RD command over the CA bus 108 at 1012. There will be a latency of $t_{RL}$ before the logic die 104 responds at 1013 with a PIM_FDBK response. In this embodiment, the PIM_FDBK response may include information relating to a period of time before the host device 101 polls the HBM+ stack 103 to determine whether the PIM operation has completed. The host device 101 may use the feedback information to schedule and perform other operations before returning to poll the HBM+ stack 103.

Thus, the effective time $t_{PIM\_WR(effective)}$ between when the PIM_WR command is issued at 1002 and when the HBM+ stack 103 is ready to receive another command from the host device 101 at 1012 is determined as $$t_{PIM\_WR(effective)} = t_{PIM\_WR} + t_{PIM\_FBDBK},$$

in which $t_{PIM\_WR}$ represents the deterministic portion of the time for the PIM operation to complete, and $t_{PIM\_FDBK}$ represents information relating to a period of time before the host device 101 polls the HBM+ stack 103 to determine whether the PIM operation has completed As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A high-bandwidth memory (HBM) system, comprising:
an HBM memory device including processing-in-memory (PIM) functionality to service PIM operations; and
a logic circuit comprising a first interface capable of being coupled to a host device and a second interface coupled to the HBM memory device through an internal bus, the first interface including a command and address bus and a data bus, the logic circuit capable of receiving a first command from the host device through the command and address (CA) bus of the first interface and a second command from the host device through the data bus, the logic circuit converting the received second-command to a PIM command for a PIM operation, the PIM command being sent to the HBM memory device through the second interface, the logic circuit issuing at least one command having overlapping timing for the PIM operation on the internal bus such that an internal bus command for the PIM operation overlaps the execution of the PIM command, wherein a latency between the HBM system receiving the first command from the host device and being ready to receive another command from the host device is deterministic.

2. The HBM system of claim 1, wherein the second command is for a PIM operation on a single address in the HBM memory device or a PIM operation on a plurality of addresses in a same row in the HBM memory device.

3. The HBM system of claim 2, wherein the second command received from the host device is for a PIM operation within one or more banks in a same channel in the HBM memory device, a latency between the second command being received from the host device and the HBM system being ready to receive another command from the host device being deterministic.

4. The HBM system of claim 1, wherein the second command received from the host device is for a PIM operation across different banks in the HBM memory device, a latency between the second command being received from the host device and the HBM system being ready to receive another command from the host device being deterministic.

5. The HBM system of claim 1, wherein the logic circuit further receives a third command from the host device through the CA bus and a fourth command through the data bus for a PIM operation in the HBM memory device, the fourth command from the host device being subsequent to the third command, the fourth command requesting a first estimate information relating to a latency between the fourth command being received from the host device and the HBM system being ready to receive another command from the host device, the first estimate information including a deterministic portion and an estimated portion.

6. The HBM system of claim 1, wherein the logic circuit further receives a third command from the host device through the CA bus and a fourth command through the data bus for a PIM operation in the HBM memory device, the fourth command from the host device being subsequent to the third command, the fourth command requesting an estimate information relating to a latency between the fourth command being received from the host device and the HBM system being ready to receive another command from the host device, the estimate information including a deterministic portion and a credit-based portion.

7. The HBM system of claim 1, wherein the logic circuit further receives a third command from the host device through the CA bus and a fourth command through the data bus for a PIM operation in the HBM memory device, the fourth command from the host device being subsequent to the third command, the fourth command requesting an estimate information relating to a latency between the fourth command being received from the host device and the HBM system being ready to receive another command from the host device, the estimate information including a deterministic portion and a retry portion.

8. The HBM system of claim 1, wherein the second command is for a PIM operation within one or more banks in a same channel in the HBM memory device.

9. The HBM system of claim 1, wherein the second command is for a PIM operation across different banks in the HBM memory device.

10. The HBM system of claim 1, wherein the commands having parallel timing paths include a read command and a write command.

11. A high-bandwidth memory (HBM) system, comprising:
an HBM device; and
a logic circuit comprising a first interface capable of being coupled to a host device and a second interface coupled to the HBM device, the logic circuit capable of receiving one or more commands from the host device and converting each received command to at least one corresponding processing-in-memory (PIM) command, each PIM command being sent through the second interface to the HBM device, the logic circuit further capable of receiving a first command from the host device for a PIM operation in the HBM device, and a second command from the host device subsequent to the first command, the second command requesting a first time-estimate information relating to a time between when the second command is received from the host device and when the HBM system is ready to receiving another command from the host device, the first time-estimate information including a deterministic period of time and a non-deterministic period of time.

12. The HBM system of claim 11, wherein the non-deterministic period of time comprises an estimated period of time.

13. The HBM system of claim 11, wherein the logic circuit further receives a third command from the host device for a PIM operation in the HBM device, and a fourth command from the host device subsequent to the third command, the fourth command requesting a second time-estimate information relating to a time between when the third command is received from the host device and when the HBM system is ready to receive another command from the host device, the second time-estimate information including a deterministic period of time and a credit-based period of time.

14. The HBM system of claim 13, wherein the logic circuit further receives a fifth command from the host device for a PIM operation in the HBM device, and a sixth command from the host device subsequent to the fifth command, the sixth command requesting a third time-estimate information relating to a time between when the sixth command is received from the host device and when the HBM system is ready to receiving another command from the host device, the third time-estimate information including a deterministic period of time and a retry period of time.

15. The HBM system of claim 14, wherein the logic circuit further receives a seventh command from the host device for a PIM operation in the HBM device, a time between when the seventh command is received from the host device and when the HBM system is ready to receive another command from the host device being deterministic.

16. The HBM system of claim 15, wherein the seventh command is for a PIM operation on a single address in the HBM device or a PIM operation on a plurality of addresses in a same row in the HBM device.

17. The HBM system of claim 16, wherein the logic circuit further receives an eighth command from the host device for a PIM operation within one or more banks in a same channel in the HBM device, a time between when the eighth command is received from the host device and when the HBM system is ready to receive another command from the host device being deterministic.

18. The HBM system of claim 17, wherein the logic circuit further receives a ninth command from the host device for a PIM operation across different banks in the HBM, a time between when the ninth command is received from the host device and when the HBM system is ready to receive another command from the host device being deterministic.

19. The HBM system of claim 11, wherein the non-deterministic period of time comprises a credit-based period of time.

20. The HBM system of claim 11, wherein the non-deterministic period of time comprises a retry period of time.

* * * * *